United States Patent
Lee

(10) Patent No.: US 7,712,896 B1
(45) Date of Patent: May 11, 2010

(54) EYEGLASSES AND ASSEMBLY METHOD THEREOF

(75) Inventor: Hsing-Jen Lee, Tainan (TW)

(73) Assignee: High Rainbow Ent. Co., Ltd., Tainan (TW)

( * ) Notice: Subject to any disclaimer, the term of this patent is extended or adjusted under 35 U.S.C. 154(b) by 0 days.

(21) Appl. No.: 12/337,992

(22) Filed: Dec. 18, 2008

(30) Foreign Application Priority Data

Sep. 12, 2008 (TW) .............................. 97134962 A

(51) Int. Cl.
*G02C 5/14* (2006.01)
(52) U.S. Cl. ........................ 351/121; 351/123; 351/153; 16/228
(58) Field of Classification Search .................. 351/41, 351/110, 111–123, 153, 154; 16/228
See application file for complete search history.

(56) References Cited

U.S. PATENT DOCUMENTS

| | | | |
|---|---|---|---|
| 3,574,452 A | 4/1971 | Hanson | |
| 4,699,479 A | 10/1987 | Metcalfe | |
| 4,832,478 A | 5/1989 | Salce | |
| 4,978,209 A | 12/1990 | Ohba | |
| 5,069,541 A | 12/1991 | Holmes et al. | |
| 5,173,722 A | 12/1992 | Calamand | |
| 5,471,258 A | 11/1995 | Hsieh | |
| 5,594,511 A | 1/1997 | Lin | |
| 5,898,471 A | 4/1999 | Simioni et al. | |
| 5,936,701 A | 8/1999 | Sartor | |
| 5,980,038 A | 11/1999 | Chen | |
| 6,007,196 A | 12/1999 | Saba et al. | |
| 6,238,048 B1 | 5/2001 | Fukuoka | |
| RE37,523 E | 1/2002 | Bondet | |
| 6,575,570 B2 | 6/2003 | Mauri | |
| 6,834,952 B2 | 12/2004 | Polovin | |
| 7,003,811 B2 | 2/2006 | Canavan | |
| 7,237,892 B2 | 7/2007 | Curci et al. | |
| 2009/0122256 A1* | 5/2009 | Wu | 351/120 |

* cited by examiner

*Primary Examiner*—Huy K Mai
(74) *Attorney, Agent, or Firm*—Rosenberg, Klein & Lee

(57) ABSTRACT

This invention is related to a pair of eyeglasses. The lens includes a pair of connecting pieces disposed with a connecting barb portion set on two opposite sides of the lens; the temples include a hinge portion comprising a hinge neck portion and a hinge pillar set on one end of the temples, the hinge neck portion being respectively connected to the temples and the hinge pillar; the connecting elements comprise a connecting trough with an inner trough in it, a hinge trough, and a hinge passage, and the connecting elements are respectively connected to the lens and the temples. Wherein when the lens is hinged to the connecting elements, the connecting piece is received by the hinge trough and the connecting barb portion is engaged in the inner trough; when the temples are hinged to the connecting elements, the hinge pillar is hinged in the hinge trough.

20 Claims, 10 Drawing Sheets

EYEGLASSES AND ASSEMBLY METHOD THEREOF

BACKGROUND OF THE INVENTION

1. Field of the Invention

The present invention is related to a pair of eyeglasses, and more particularly, to a pair of eyeglasses with the hinge of lens and temples of which completed by using connecting elements and its assembly method.

2. Description of Prior Art

From eyeglasses for myopia, presbyopia, and vision correction emphasizing practicality, eyewear for industry use, sunglasses, and windproof eyeglasses emphasizing functionality, to stylized eyeglasses emphasizing aesthetic appearance and fashion as mainstream, eyeglasses almost become an indispensable device in the daily life of modern people. And the most common style of eyeglass in the current market is a pair of eyeglasses with an eyeglass frame to support a pair of lens (framed eyeglasses) or with only a pair of lens (frameless eyeglasses), wherein the temples are hinged to the left and right opposite sides of the frame (lens) with screw. However, when eyeglasses hinged in such way are used for a long time, the screw may become loose or worn and thus lead to loosening of temples. At this moment a supplementary tool (screw driver) is needed to back the screw out or drive the screw in for further reparation or taking-apart. However, not only does such process of taking-apart take much time and efforts, but it is also easy for screw to be indirectly damaged and thus become unusable when being backed out or driven in. And if there is no supplementary tool at hand, then the replacement cannot be done at all, which causes much inconvenience.

In addition, when this type of eyeglass is produced by ordinary eyeglass manufacturers, it is often needed to complete the hinged connection of eyeglass frame (lens) and temples by handwork. Therefore in addition to the cost of raw materials, there will also be extra cost of manpower for performing this handwork, and thus the production cost cannot be decreased and the competitiveness in the industry is lost.

BRIEF SUMMARY OF THE INVENTION

In order to solve the aforementioned problems, one objective of the present invention is to provide a pair of eyeglasses, in which connecting elements are used for completing the hinged connection of lens and temples and the complexity in assembling is thus reduced.

Another objective of the present invention is to provide a pair of eyeglasses, the design of connecting elements of which is in correspondence with the lens and temples and allows the eyeglasses to become more solid after completion of assembly and thus achieves better effect of hinged connection.

Still another objective of the present invention is to provide a pair of eyeglasses which is assembled with a simpler method for saving time and manpower cost spent in completing hinged connection.

According to above objectives, the present invention provides a pair of eyeglasses in which hinged connection between lens and temples are completed by using connecting elements and its assembly method. The pair of eyeglasses comprises a lens, a pair of temples, and a pair of connecting elements. The lens includes a pair of connecting pieces disposed with at least a connecting barb portion set on two opposite sides of the lens; the temples include a hinge portion comprising at least a hinge neck portion and at least a hinge pillar set on one end of the temples, the hinge neck portion being respectively connected to the temples and the hinge pillar; the connecting elements comprise at least a connecting trough with at least an inner trough in it, at least a hinge trough and a hinge passage, and the connecting elements are respectively connected to the lens and the temples. Wherein when the lens is hinged to the connecting elements, the connecting piece is received by the hinge trough and the connecting barb portion is engaged in the inner trough; when the temples are hinged to the connecting elements, the hinge pillar is hinged in the hinge trough.

Since the assembly method of the pair of eyeglasses of the present invention in which connecting elements are used to complete hinged connection of lens and temples is simpler, and the complexity in assembly is also lower, the time and manpower cost spent in completing hinged connection can thus be greatly reduced. And also because the design of connecting elements is in correspondence with the lens and the temples, therefore the eyeglasses can become more solid after completion of assembly and better effect of hinged connection can also be achieved.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DESCRIPTION OF THE PREFERRED EMBODIMENT

The present invention discloses a pair of eyeglasses, and more particularly, a pair of eyeglasses in which connecting elements are used for completing the hinged connection of lens and temples and its assembly method. Since some detailed parts of process for manufacturing or processing eyeglasses are accomplished by applying prior art, therefore these parts will not be completely depicted in the description below. And the drawings referred to in the following are not made according to the actual related sizes and the function of these drawings is only for illustrating characteristics related to the present invention.

Figure 1:
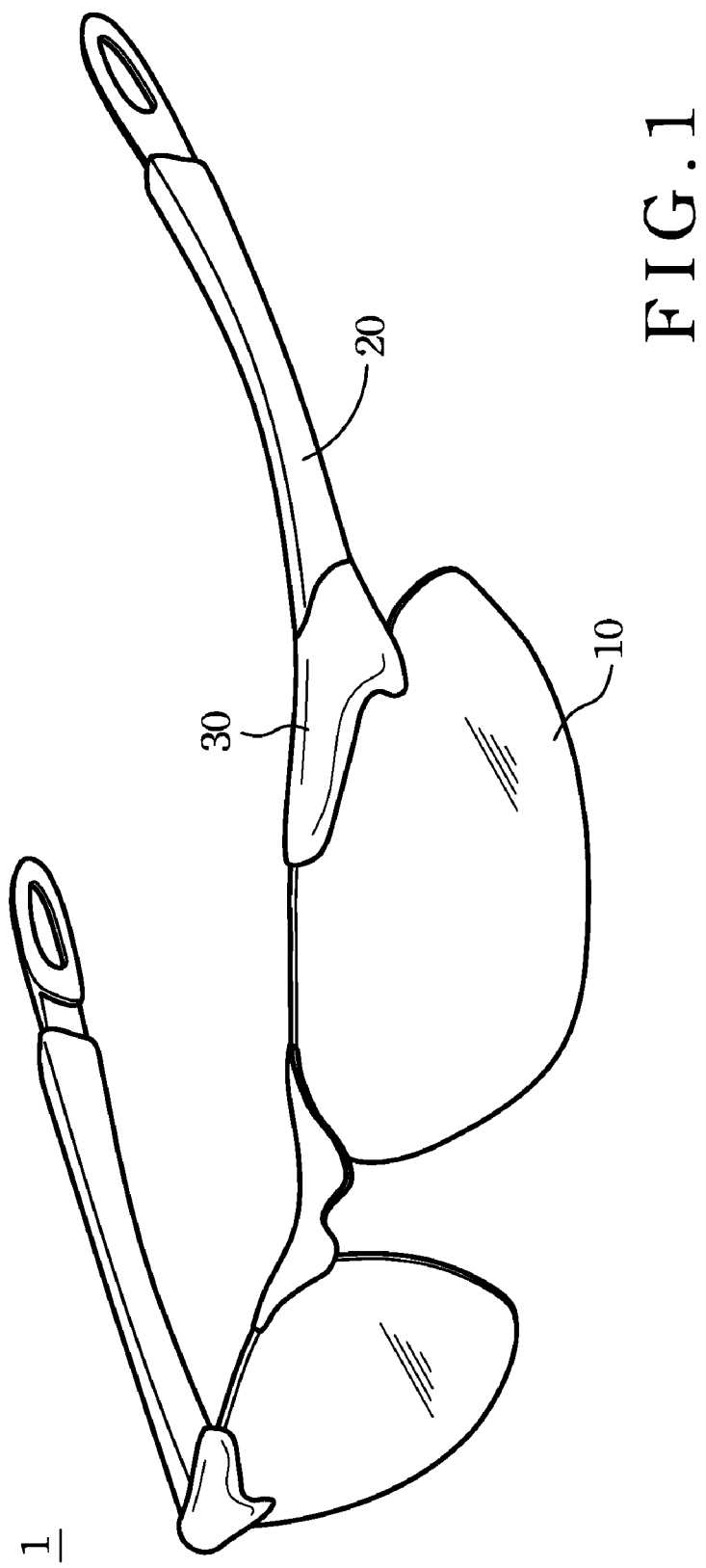
FIG. 1 is a view of eyeglasses disclosed by the present invention.
Figure 2A:
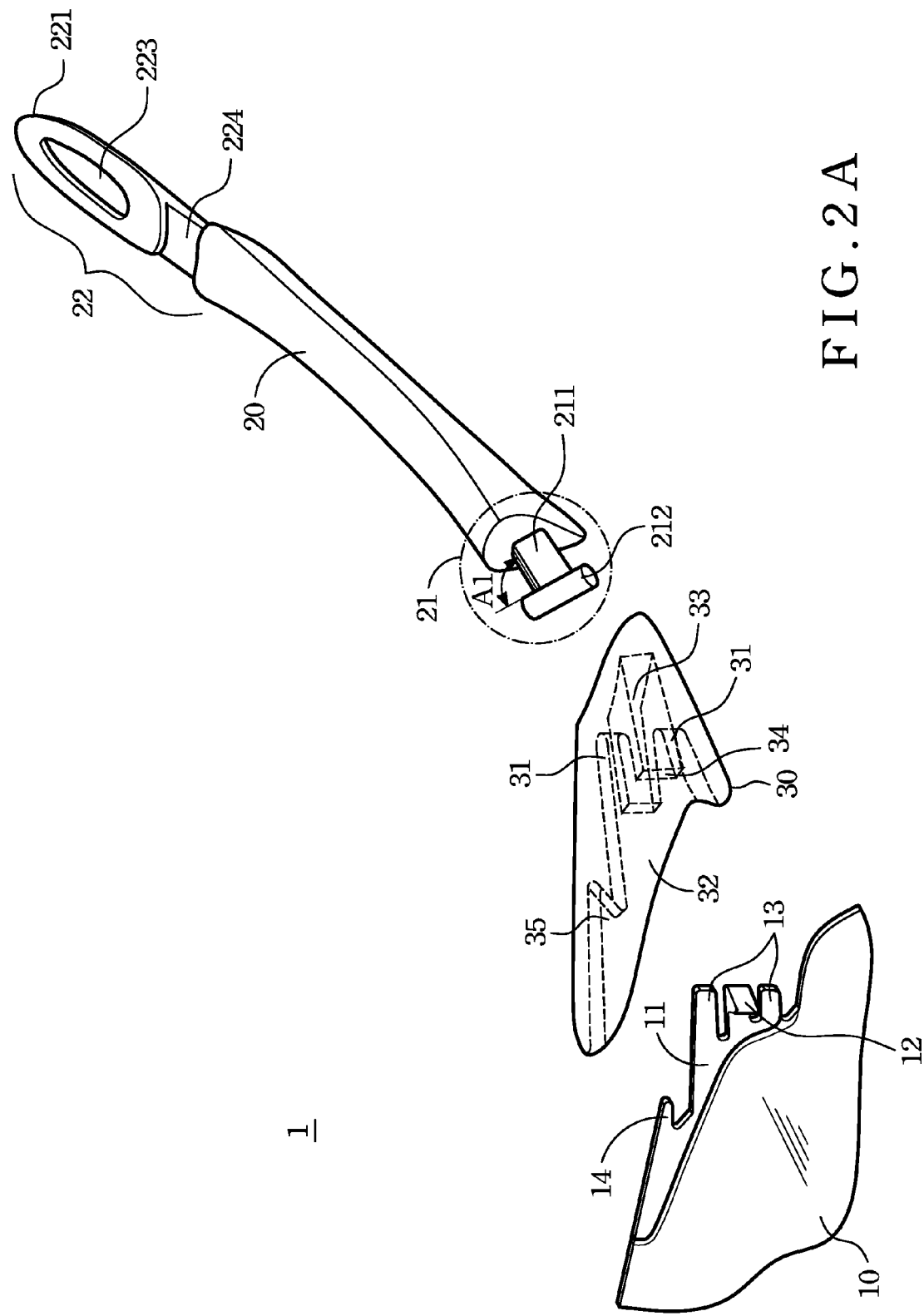
FIG. 2A is a view of structure of a preferred embodiment of eyeglasses disclosed by the present invention.
Figure 2B:
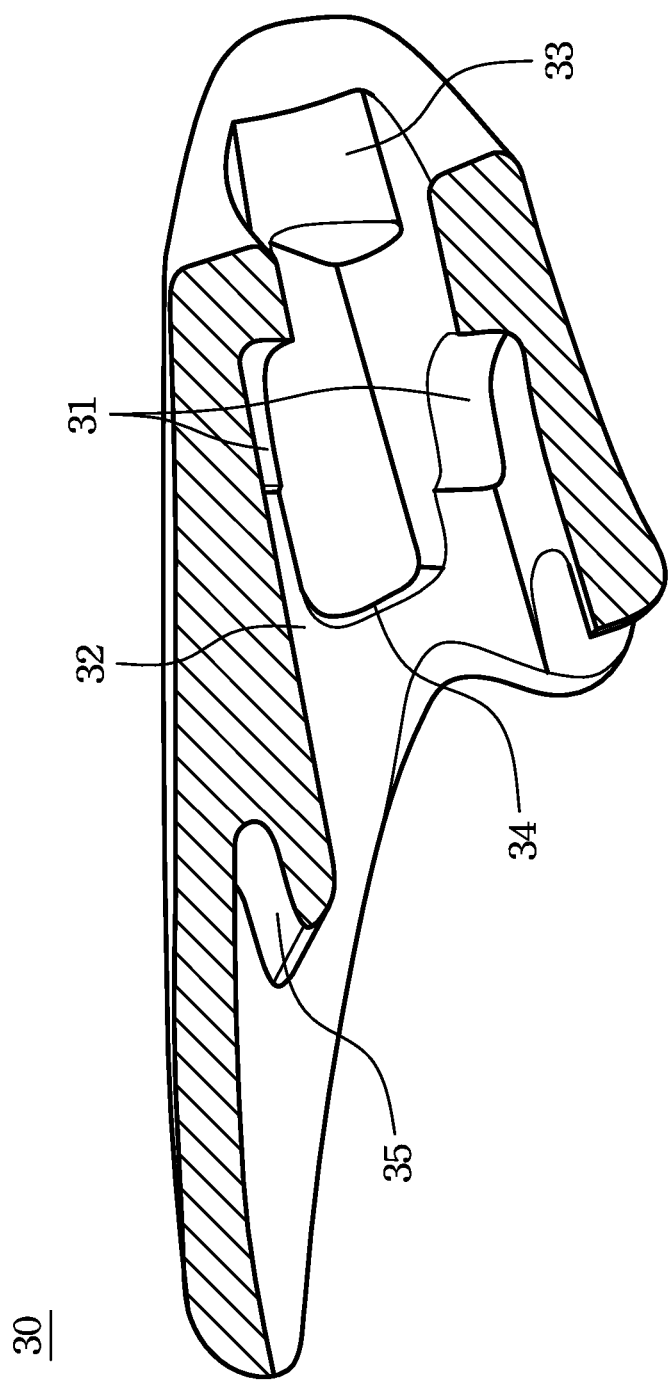
FIG. 2B is a sectional view of connecting elements of eyeglasses disclosed by the present invention.

FIG. 1 is a view of a preferred embodiment of the pair of eyeglasses according to the present invention. The pair of eyeglasses 1 is assembled by a lens 10, a pair of temples 20, and a pair of connecting elements 30. Referring to FIG. 2A, the lens 10 includes a pair of connecting pieces 11 set on two opposite sides of the lens 10 and the lens 10 and the connecting pieces 11 are integrated; the lens 10 can also be two individual pieces of lenses, and the connecting pieces 11 include at least a connecting barb portion 12. The temples 20 include a hinge portion 21 set on one end of temples 20, the hinge portion 21 is composed of at least a hinge neck portion 211 and at least a hinge pillar 212, and the hinge neck portion 211 is respectively connected to the temples 20 and the hinge pillar 212. The connecting elements 30 include at least a connecting trough 32, at least a hinge trough 31, and a hinge passage 33, and the connecting trough 32 is disposed with at least an inner trough 34, detailed sectional view of which is as shown in FIG. 2B. The connecting elements 30 are used for being respectively connected to the lens 10 and the temples 20. Wherein when the lens 10 is hinged to the connecting elements 30, the connecting piece 11 is received by the hinge trough 32 and the connecting barb portion 12 is engaged in the inner trough 34; when the temples 20 are hinged to the connecting elements 30, the hinge pillar 212 is hinged in the hinge trough 31. And after the hinged connection of the connecting piece 11 of the lens 10 and the connecting elements 30 is completed, the connecting piece 11 of the lens 10 and the hinge pillar 212 of the temples 20 are in the status of mutual resistance; therefore the temples 20 with its hinged connection completed will not loosen and the assembly of eyeglasses 1 can also be completed in a simple and fast way.

The present invention provides another preferred embodiment of a pair of eyeglasses, which is composed of a lens, a frame, and a pair of temples. The lens includes a pair of connecting pieces set on two opposite sides of the lens and the lens and the connecting pieces are integrated, the connecting pieces being disposed with at least a connecting barb portion; the lens can also be two individual pieces of lenses. The frame is used for accommodating a lens and includes a pair of connecting elements set on two opposite sides of the frame, and the frame and the connecting elements are integrated. The temples include a hinge portion set on one end of the temples, the hinge portion is composed of at least a hinge neck portion and at least a hinge pillar, and the hinge neck portion is respectively connected to the temples and the hinge pillar. Wherein, the connecting elements comprise at least a connecting trough with an inner trough disposed in it, at least a hinge trough, and a hinge passage, and the connecting elements are respectively connected to the lens and the temples. Wherein when the lens is hinged to the connecting elements of the frame, the connecting piece is received by the hinge trough and the connecting barb portion is engaged in the inner trough; when the temples are hinged to the connecting elements of the frame, the hinge pillar is hinged in the hinge trough. And after the hinged connection of the connecting piece of the lens and the connecting elements is completed, the connecting piece of the lens and the hinge pillar of the temples are in the status of mutual resistance; therefore the temples with its hinged connection completed will not loosen and the assembly of eyeglasses can also be completed in a simple and fast way.

Following what is described about two preferred embodiments, regarding parts related to structure of the lens 10, in addition to that the structure of the connecting barb portion 12 of the lens 10 can be an individual piece, at least a wing portion 13 can also be disposed on left and right sides of the connecting barb portion 12; and the wing portion 13 and the connecting barb portion 12 are structures with part connecting to each other, and thus the connecting barb portion 12 can have the property of better individual flexibility. One side of connecting piece 11 is disposed with a fin portion 14, and in the connecting elements 30 is disposed with a fin-shaped trough 35, the location of which corresponds to the fin portion 14 and the trough shape of which corresponds to the shape of the fin portion 14. With this design, the corresponding area between the lens 10 and the connecting elements 30 when being connected to each other can be increased and thus the eyeglasses 1 with its assembly completed can become more solid and less easy to shake.

Figure 3:
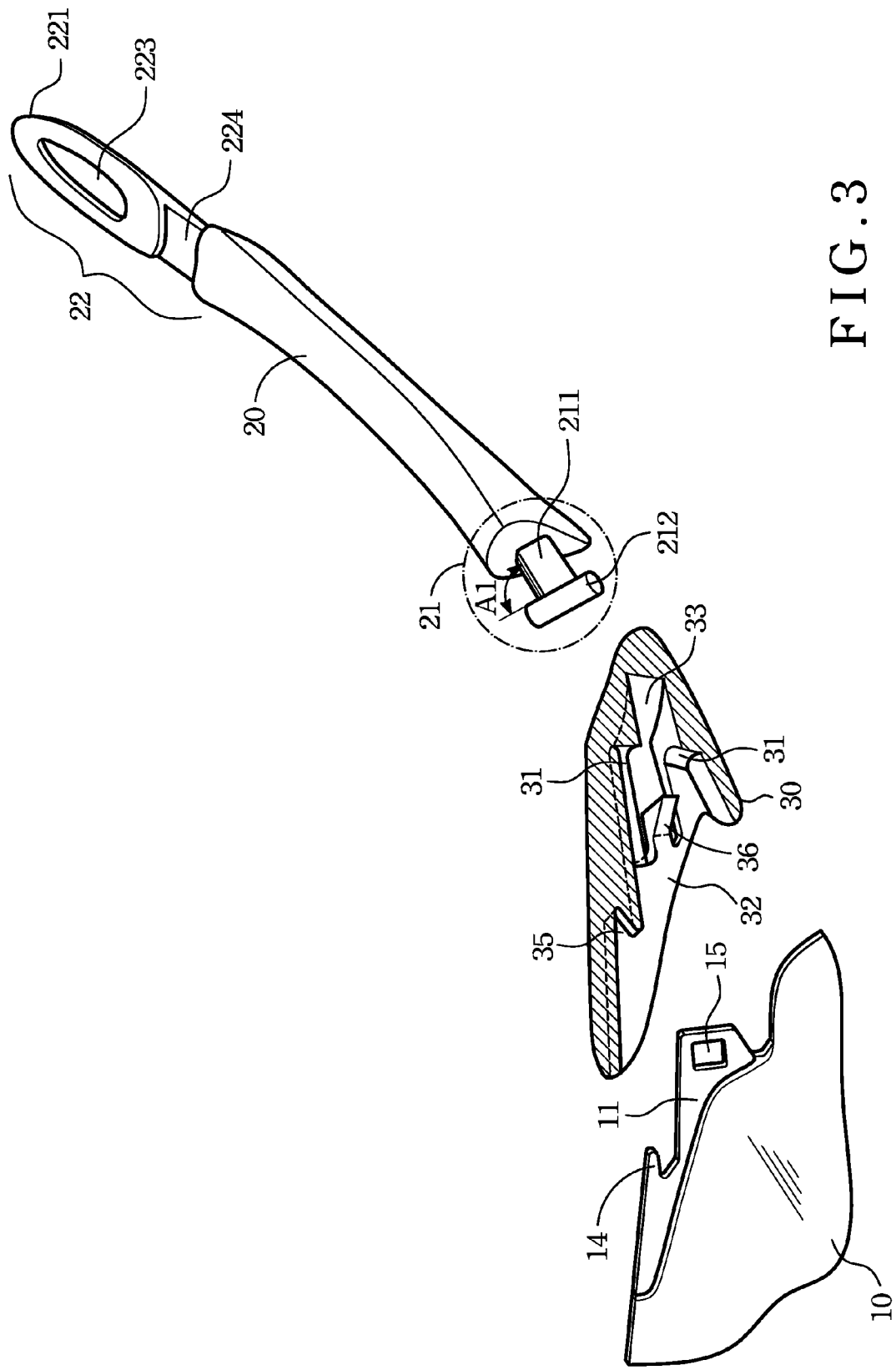
FIG. 3 is a view of structure of another preferred embodiment of eyeglasses disclosed by the present invention.

FIG. 3 is a view of still another preferred embodiment of the pair of eyeglasses according to the present invention. The pair of eyeglasses 1 is assembled by a lens 10, a pair of temples 20, and a pair of connecting elements 30. The lens 10 includes a pair of connecting pieces 11 set on two opposite sides of the lens 10 and the lens 10 and the connecting pieces 11 are integrated; the lens 10 can also be two individual pieces of lenses, and the connecting pieces 11 include at least a trough portion (blow hole 15 or notch). The temples 20 include a hinge portion 21 set on one end of temples 20, the hinge portion 21 is composed of at least a hinge neck portion 211 and at least a hinge pillar 212, and the hinge neck portion 211 is respectively connected to the temples 20 and the hinge pillar 212. The connecting elements 30 include at least a connecting trough 32, a connecting barb portion 36, at least a hinge trough 31, and a hinge passage 33, the connecting barb portion 36 being disposed on sidewall neighboring to the connecting trough 32. The connecting elements 30 are used for being respectively connected to the lens 10 and the temples 20. Wherein when the lens 10 is hinged to the connecting elements 30, the connecting piece 11 is received by the hinge trough 32 and the connecting barb portion 36 is engaged in the trough portion (blow hole 15 or notch); when the temples 20 are hinged to the connecting elements 30, the hinge pillar 212 is hinged in the hinge trough 31. And after the hinged connection of the connecting piece 11 of the lens 10 and the connecting elements 30 is completed, the connecting piece 11 of the lens 10 and the hinge pillar 212 of the temples 20 are in the status of mutual resistance; therefore the temples 20 with its hinged connection completed will not loosen and the assembly of eyeglasses 1 can also be completed in a simple and fast way.

The present invention provides yet another preferred embodiment of a pair of eyeglasses, which is composed of a lens, a frame, and a pair of temples. The lens includes a pair of connecting pieces set on two opposite sides of the lens and the lens and the connecting pieces are integrated, the connecting pieces being disposed with at least a trough portion (blow hole or notch); the lens can also be two individual pieces of lenses. The frame is used for accommodating a pair of lenses and includes a pair of connecting elements set on two opposite sides of the frame, and the frame and the connecting elements are integrated. The temples include a hinge portion set on one end of the temples, the hinge portion is composed of at least a hinge neck portion and at least a hinge pillar, and the hinge neck portion is respectively connected to the temples and the hinge pillar. Wherein, the connecting elements comprise at least a connecting trough, a connecting barb portion, at least a hinge trough, and a hinge passage, the connecting barb portion being disposed on sidewall neighboring to the connecting trough and the connecting elements of the frame being respectively connected to the lens and the temples. When the lens is hinged to the connecting elements of the frame, the connecting piece is received by the hinge trough and the connecting barb portion is engaged in the trough portion (blow hole or notch); when the temples are hinged to the connecting elements of the frame, the hinge pillar is hinged in the hinge trough. And after the hinged connection of the connecting piece of the lens and the connecting elements of the frame is completed, the connecting piece of the lens and the hinge pillar of the temples are in the status of mutual resistance; therefore the temples with its hinged connection completed will not loosen and the assembly of eyeglasses can also be completed in a simple and fast way.

Following what is described about two preferred embodiments, regarding parts related to structure of the lens 10, a fin portion 14 is disposed on one side of the connecting piece 11, and a fin-shaped trough 35 is disposed in the connecting elements 30, the location of which corresponds to the fin portion 14 and the trough shape of which corresponds to the shape of the fin portion 14. With this design, the corresponding area between the lens 10 and the connecting elements 30 when being connected to each other can be increased and thus the eyeglasses 1 with its assembly completed can become more solid and less easy to shake.

Figure 4A:
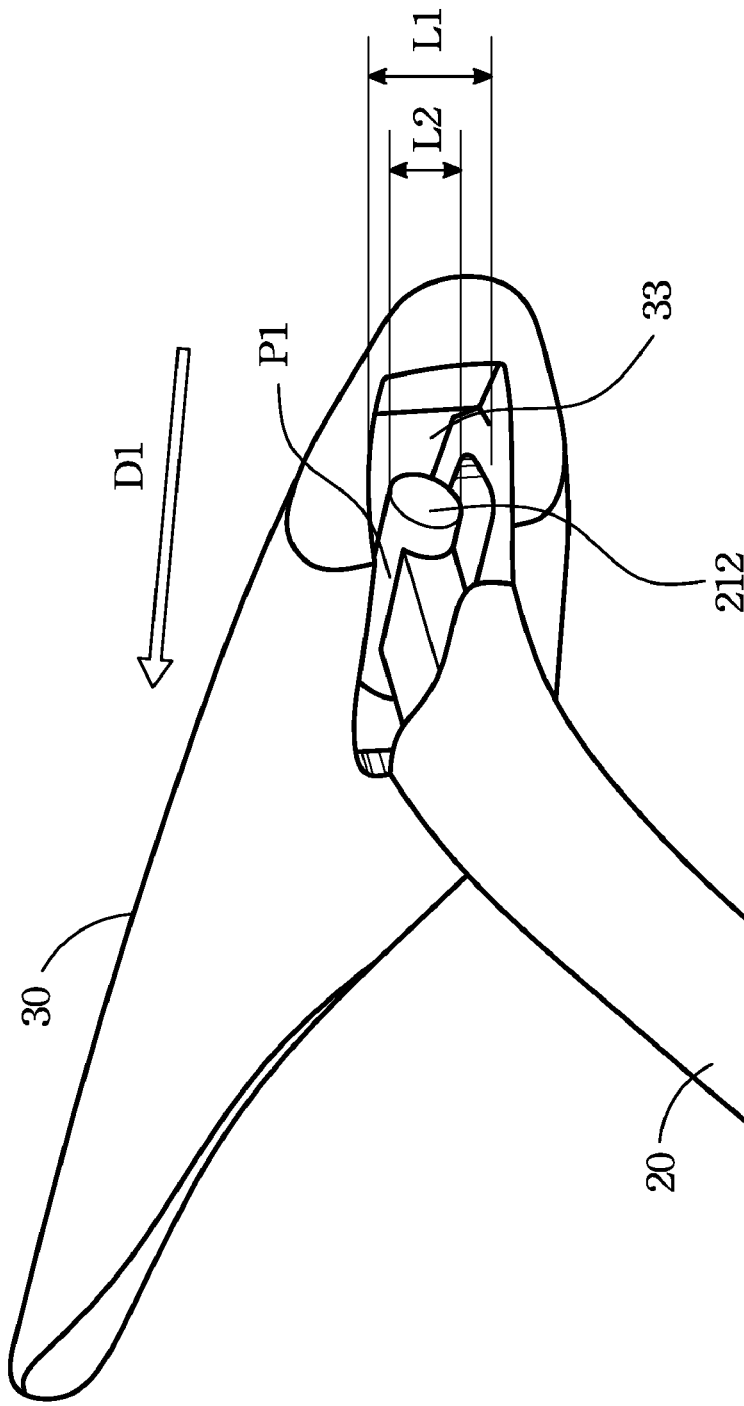
FIG. 4A to FIG. 4C are views of each step of assembling temples and connecting elements of eyeglasses disclosed by the present invention.
Figure 4B:
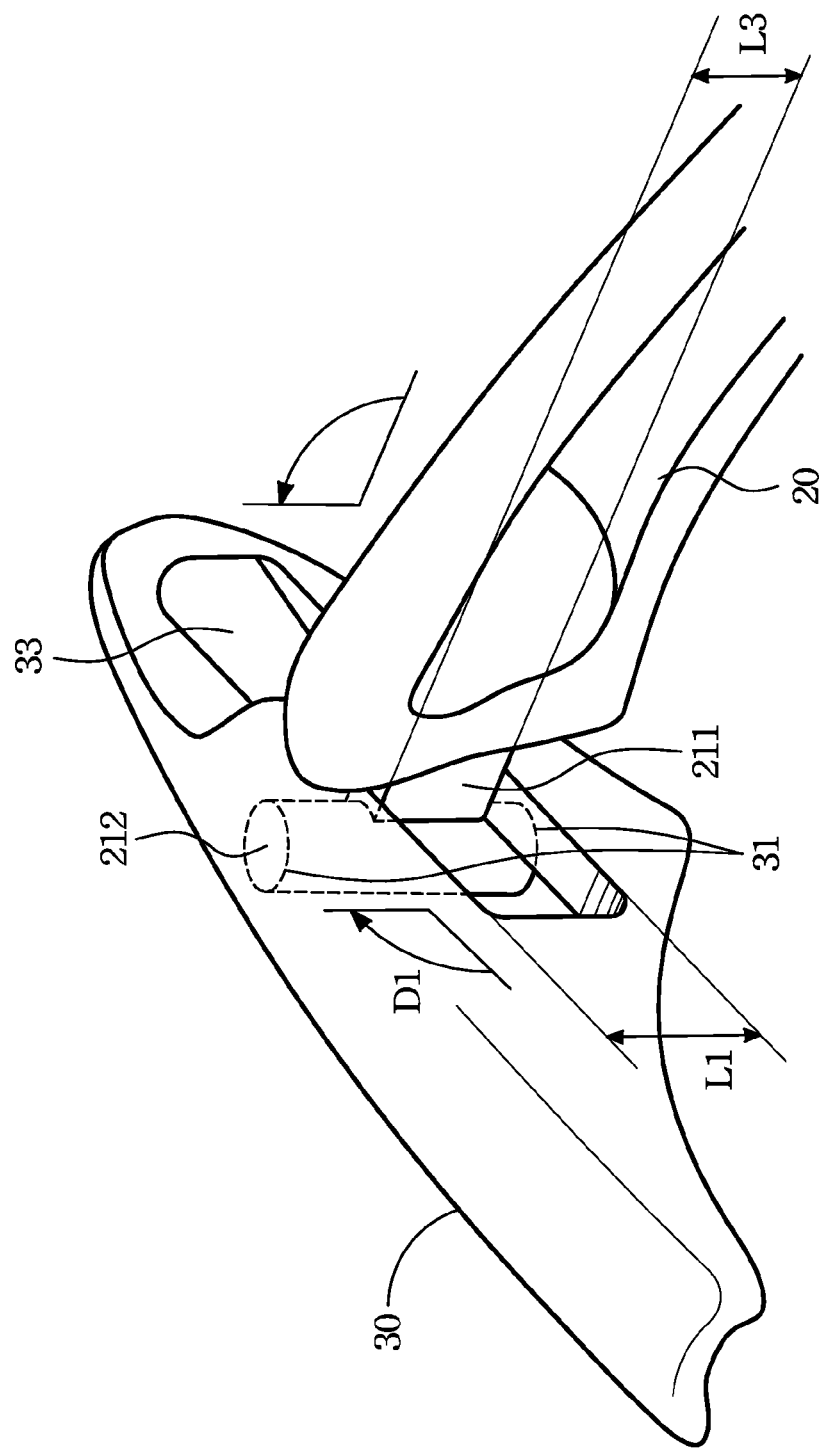

According to all embodiments described above, the hinge portion 21 of temples 20 of the present invention is composed of hinge neck portion 211 and hinge pillar 212, referring to FIG. 2A or FIG. 3, and the hinge neck portion 211 is respectively connected to the temples 20 and the hinge pillar 212; therefore the hinge portion 21 can be a quasi-T shaped structure or a quasi-L shaped structure, and the included angle A1 between the hinge neck portion 211 and the hinge pillar 212 can be a right angle. In this embodiment, the hinge pillar 212 can be a quasi-circular cylinder, quasi-square cylinder, or quasi-regular polygon cylinder. And in the embodiment disclosed in the present invention, the size of hinge passage 33 and hinge trough 31 are defined as: the width L1 of hinge passage 33 is longer than the cylinder diameter L2 of hinge pillar 212 (as shown in FIG. 4A), the width L1 of hinge passage 33 is same long as or slightly longer than the width L3 of hinge neck portion 211 (as shown in FIG. 4B), and the space in hinge trough 31 is larger than the rotating space of rotation for 90 degrees with hinge pillar 212 as center. Therefore the hinge trough 31 provides enough space for the rotation of hinge pillar 212, and the hinge pillar 212 after rotation is as shown in FIG. 4C.

In regards to parts related to structure of the connecting elements 30, the connecting trough 32 and the hinge trough 31 are a trough body connecting to each other and can be a quasi-rectangular trough body. Therefore, when the lens 10 and the connecting elements 30 are connected to each other, the connecting barb portion 12 is engaged in the inner trough 34, the temples 20 and the connecting elements 30 are hinged to each other, and the hinge pillar 212 is hinged in the hinge trough 31. Meanwhile, the connecting barb portion 12 and the hinge pillar 212 are in the status of mutual resistance, and even the wing portion 13 and the hinge pillar 212 can be in the status of mutual resistance, so that the eyeglasses 1 with its assembly completed will become more solid and less easy to shake.

Figure 4C:
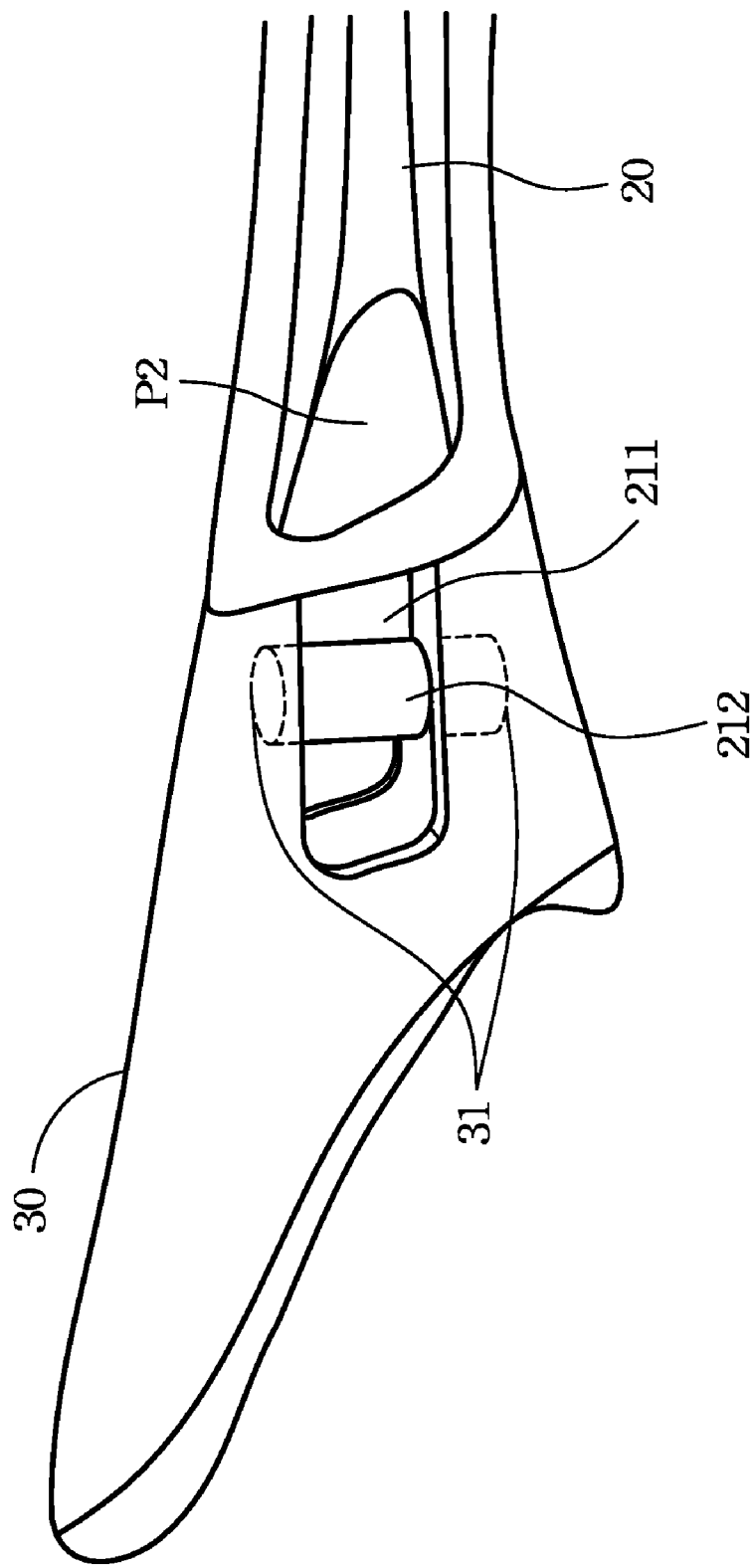

Moreover, according to the structure described above, the present invention further discloses assembly method of eyeglasses, still referring to FIG. 2A, FIG. 4A, FIG. 4B, and FIG. 4C, steps of which comprising: providing a lens 10, the lens 10 including a pair of connecting pieces 11 set on two opposite sides of the lens 10, the connecting pieces 11 including at least a connecting barb portion 12, at least a wing portion 13, and at least a fin portion 14, the wing portion 13 being respectively disposed on left and right sides of the connecting barb portion 12 and the fin portion 14 being disposed on one side of the connecting pieces; providing a pair of temples 20, the temples 20 including a hinge portion 21 disposed on one end of the temples 20, the hinge portion 21 being composed of at least a hinge neck portion 211 and at least a hinge pillar 212, the hinge neck portion 211 being respectively connected to the temples 20 and the hinge pillar 212 and the hinge neck portion 211 being connected onto the hinge pillar 212, therefore the hinge portion 21 being able to be a quasi-T shaped or quasi-L shaped structure; providing a pair of connecting elements 30, the connecting elements 30 including at least a connecting trough 32, a fin-shaped trough 35, at least a hinge trough 31, and at least a hinge passage 33, at least an inner trough 34 being disposed in the connecting trough 32, and the connecting elements 30 being respectively connected to the lens 10 and the temples 20; hinging temples 20 and connecting elements 30, as shown in FIG. 4A, placing hinge pillar 212 in hinge passage 33 and moving to first position P1 in first direction D1, rotating hinge portion 21 for 70∞130 degrees, commonly designed to be 90 degrees, for hinge pillar 212 to be hinged in hinge trough 31, as shown in FIG. 4B, moving temples 20 to second position P2 in second direction D2 for hinge neck portion 211 to be placed in hinge passage 33, as shown in FIG. 4C; connecting lens 10 and connecting elements 30, connecting pieces 11 being received by connecting trough 32, connecting barb portion 12 being engaged in inner trough 34, and fin portion 14 being received by fin-shaped trough 35 for the connecting barb portion 12 and wing portion 13 and the hinge pillar 212 to be in status of mutual resistance, with which not only can temples 20 be positioned in hinge trough 31, but a pivot for rotation of temples 20 can also be provided, and therefore the assembly of eyeglasses 1 can be completed in a simple and fast way according to this assembly method, as shown in FIG. 1.

Figure 5A:
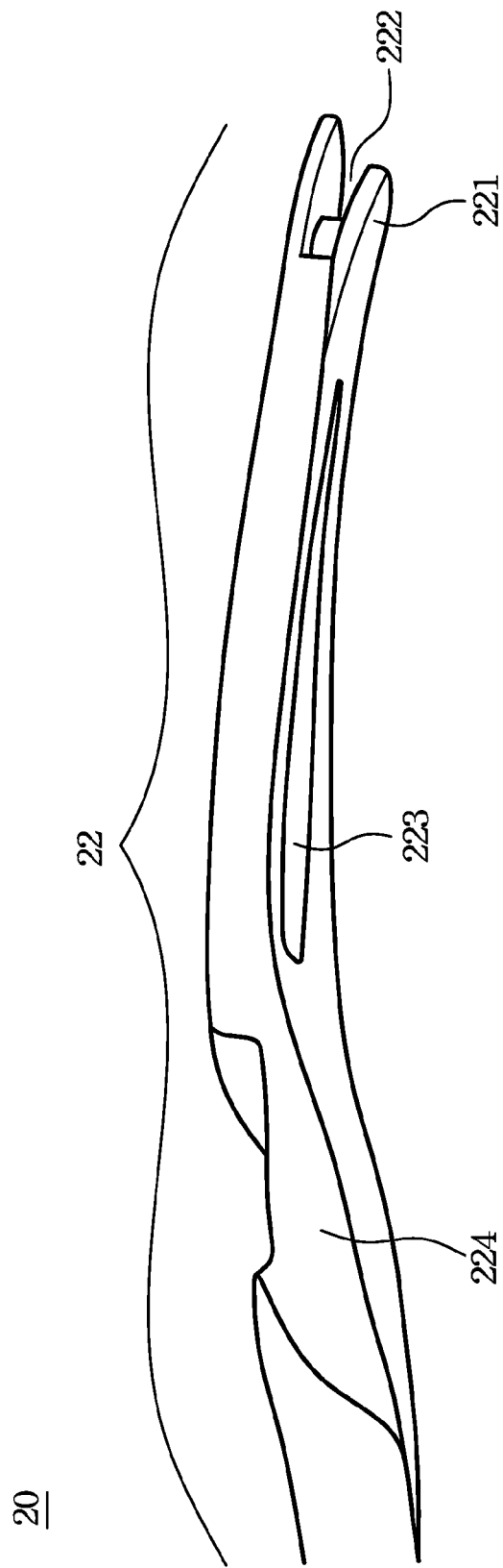
FIG. 5A is a stereogram of temple disclosed by the present invention.
Figure 5B:
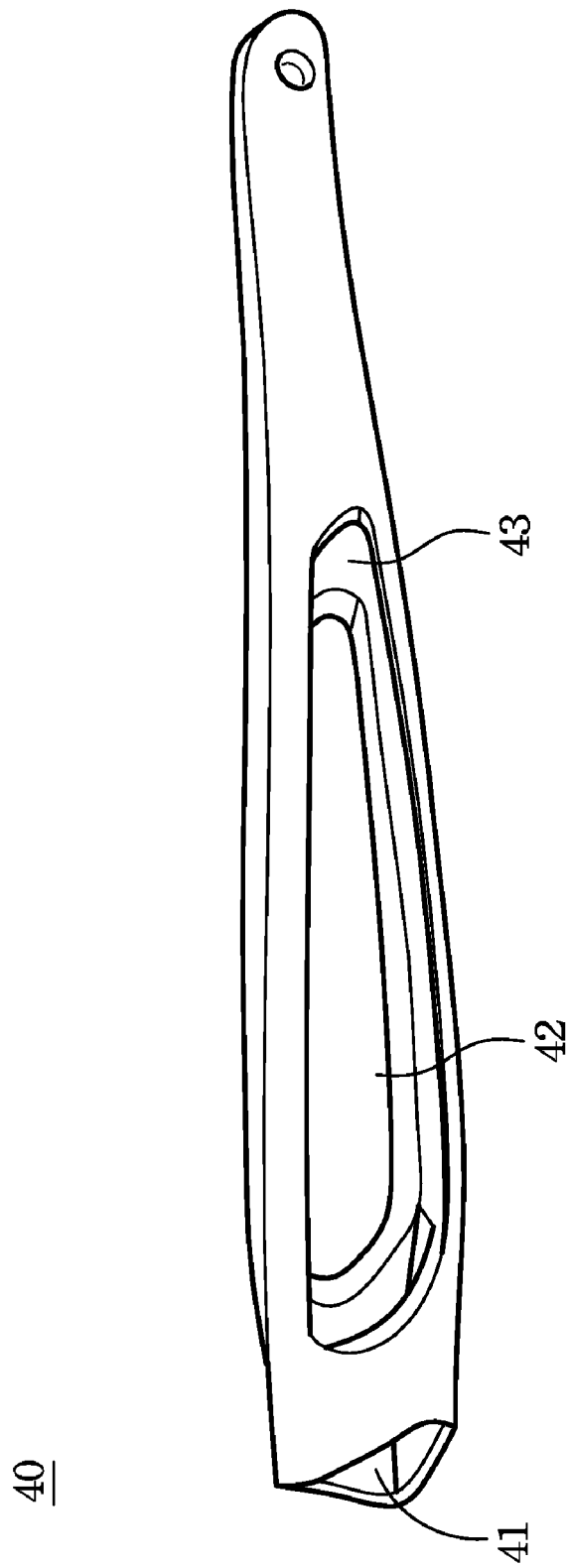
FIG. 5B is a stereogram of temple tip disclosed by the present invention.

The present invention further provides a temple tip 40 for being sheathed onto the temples 20, as shown in FIG. 5A. From the central part of temples 20 to one end opposite to the hinge portion 21 is a temple end section 22, one end of which is disposed with a fork-clasp portion 221 having a fork-clasp notch 222; therefore the fork-clasp portion 221 and the fork-clasp notch 222 can be in a quasi-C shape, quasi-L shape, or reverse-L-shape. The temple end section 22 further includes a first through hole 223 and a saddle portion 224, wherein the saddle portion 224 is closer to central part of temples 20 than the first through hole 223 and therefore the first through hole 223 is located between the saddle portion 224 and the fork-clasp portion 221. Referring to FIG. 5B, the temple tip 40 is a hollow strip body made of an elastic material. The temple tip 40 includes an engaging opening 41, a second through hole 42, and a resisting portion 43, the engaging opening 41 being disposed on end of temple tip 40, the second through hole 42 being disposed on temple tip 40 with one end of which connected to the engaging opening 41, and the resisting portion 43 being disposed on one end of second through hole 42 opposite to the engaging opening 41.

Figure 6:
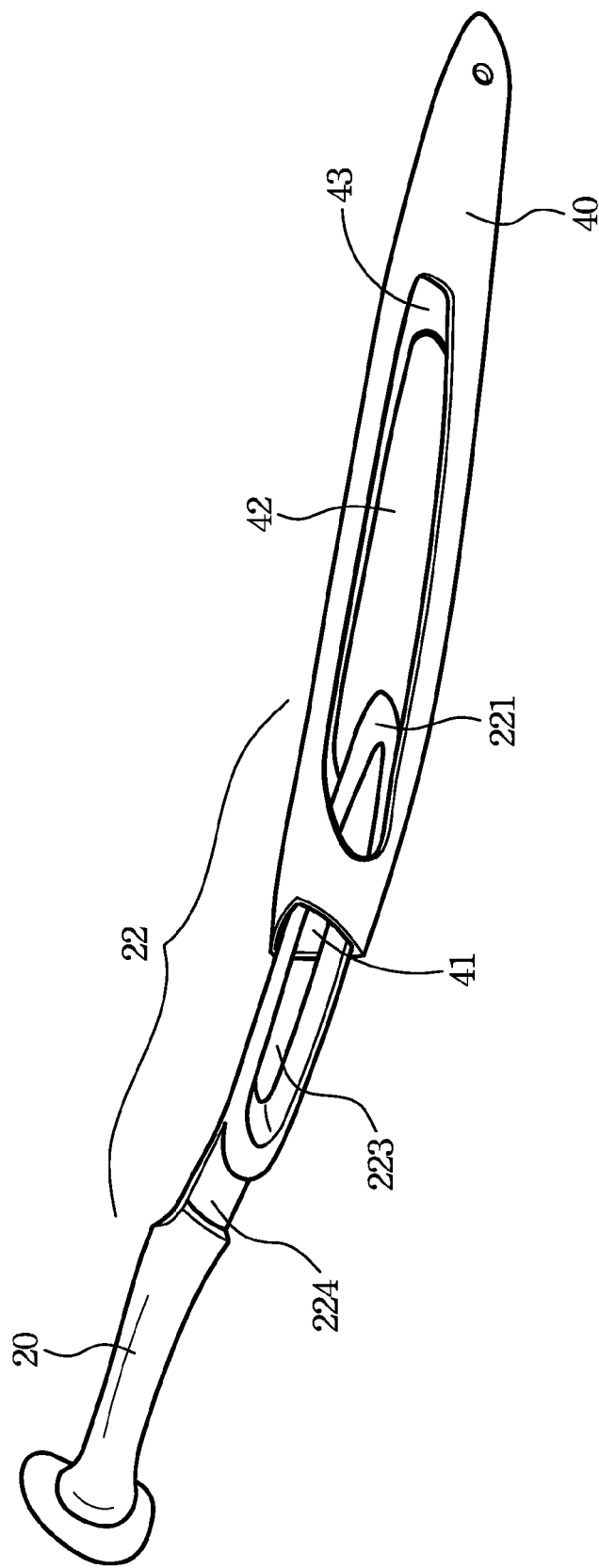
FIG. 6 is a view of structure of assembly of temple and temple tip disclosed by the present invention.

Assembly of aforementioned temples 20 and temple tip 40 comprises the following steps: providing a temple 20, the temple 20 includes a fork-clasp portion 221, a fork-clasp notch 222 (as shown in FIG. 5A), a first through hole 223, and a saddle portion 224, from the central part of temple 20 to one end opposite to the hinge portion 21 (as shown in FIG. 2A) being a temple end section 22, the fork-clasp portion 221 being disposed on one end of the temple end section 22, and the fork-clasp notch 222 being disposed in the fork-clasp portion 221, therefore the fork-clasp portion 221 and the fork-clasp notch 222 being able to form a quasi-C shape, quasi-L shape, or reverse-L-shape; the first through hole 223 being disposed on the temple end section 22, the saddle portion 224 being disposed at central part of the temple end section 22 near the temple 20, therefore the first through hole 223 being located between the saddle portion 224 and the fork-clasp portion 221; providing temple tip 40, as shown in FIG. 5B, the temple tip 40 including an engaging opening 41, a second through hole 42, and a resisting portion 43, the engaging opening 41 being disposed on one end of temple tip 40, the second through hole 42 being disposed on temple tip 40 with one end of which connected to the engaging opening 41, and the resisting portion 43 being disposed on one end of second through hole 42 opposite to the engaging opening 41; sheathing the temple 20 into the temple tip 40 with the temple 20 penetrating the engaging opening 41 for the temple 20 to be received by the temple tip 40, the fork-clasp portion 221 clamping the resisting portion 43, the fork-clasp notch 222 resisting the resisting portion 42, the first through hole 223 being in correspondence to the second through hole 42, and the saddle portion 224 being coveringly disposed between the engaging opening 41 and the second through hole 42, with these steps the assembly of temple 20 and temple tip 40 being completed in a simple and fast way without loosening, as shown in FIG. 6.

Since the assembly method of the pair of eyeglasses of the present invention in which connecting elements are used to complete hinged connection of lens and temples is simpler, and the complexity in assembly is also lower, the time and manpower cost spent in completing hinged connection can thus be greatly reduced. And also because the design of connecting elements is in correspondence with the lens and the temples, therefore the eyeglasses can become more solid after completion of assembly and better effect of hinged connection can also be achieved.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A pair of eyeglasses, comprising:
    a lens, said lens including a pair of connecting pieces disposed on left and right sides of said lens, wherein said connecting pieces include at least a connecting barb portion;
    a pair of temples, including a hinge portion disposed on one end of said temples, wherein said hinge portion is composed of at least a hinge neck portion and at least a hinge pillar, said hinge neck portion being respectively connected to said temples and said hinge pillar; and
    a pair of connecting elements, said connecting elements including at least a connecting trough, at least a hinge trough, and a hinge passage, at least an inner trough being disposed in said connecting trough, said connecting elements being respectively connected to said lens and said temples;
    wherein when said lens and said connecting elements are connected to each other, said connecting pieces are received by said connecting trough, said connecting barb portion is engaged in said inner trough, and when said temples and said connecting elements are hinged to each other, said hinge pillar is hinged in said hinge trough.

2. The pair of eyeglasses according to claim 1, further comprising at least a wing portion disposed on one side of said connecting barb portion, said wing portion and said connecting barb portion being partially connected to each other.

3. The pair of eyeglasses according to claim 1, further comprising at least a fin portion disposed on one side of said connecting pieces.

4. The pair of eyeglasses according to claim 3, further comprising at least a fin-shaped trough disposed in said connecting elements, said fin-shaped trough corresponding to said fin portion.

5. The pair of eyeglasses according to claim 1, wherein said lens and said connecting pieces are integrated.

6. The pair of eyeglasses according to claim 1, wherein shape of said hinge portion is selected from the group consisting of a quasi-T shape and a quasi-L shape.

7. The pair of eyeglasses according to claim 1, wherein shape of said hinge pillar is selected from the group consisting of a quasi-circular cylinder, a quasi-square cylinder, and a quasi-regular-polygon cylinder.

8. The pair of eyeglasses according to claim 1, wherein said connecting trough and said hinge trough are a trough body connecting to each other.

9. The pair of eyeglasses according to claim 8, wherein said trough body is a rectangular trough body.

10. The pair of eyeglasses according to claim 1, wherein width of said hinge passage is longer than cylinder diameter of said hinge pillar.

11. The pair of eyeglasses according to claim 1, wherein width of said hinge passage is same long as or slightly longer than width of said hinge neck portion.

12. The pair of eyeglasses according to claim 1, wherein from about central part of said temple to another end of said temple is a temple end section, and a fork-clamp portion is disposed on one end of said temple end section, said fork-clamp portion further including a fork-clamp notch.

13. The pair of eyeglasses according to claim 12, wherein shape formed by said fork-clamp portion and said fork-clamp notch is selected from the group consisting of a quasi-C shape and a quasi-L shape.

14. The pair of eyeglasses according to claim 12, further comprising a first through hole disposed on said temple end section.

15. The pair of eyeglasses according to claim 12, further comprising a saddle portion disposed on said temple end section.

16. The pair of eyeglasses according to claim 1, further comprising a temple tip, said temple tip being a hollow strip body and including an engaging opening disposed on one end of said temple tip and a second through hole disposed on said temple tip, said engaging opening and one end of said second through hole being connected to each other.

17. The pair of eyeglasses according to claim 16, further comprising a resisting portion disposed on one end of said second through hole opposite to said engaging opening.

18. The pair of eyeglasses according to claim 16, wherein said temple tip is made of an elastic material.

19. A pair of eyeglasses, comprising:
    a lens, said lens including a pair of connecting pieces disposed on left and right sides of said lens, wherein said connecting pieces include at least a connecting barb portion;
    a frame for accommodating said lens, said frame including a pair of connecting elements disposed on left and right sides of said frame; and
    a pair of temples, including a hinge portion disposed on one end of said temples, wherein said hinge portion is composed of at least a hinge neck portion and at least a hinge pillar, said hinge neck portion being respectively connected to said temples and said hinge pillar;
    wherein said connecting elements include at least a connecting trough, at least a hinge trough, and a hinge passage, at least an inner trough being disposed in said connecting trough, said connecting elements being respectively connected to said lens and said temples, when said lens and said connecting elements of said frame are connected to each other, said connecting pieces are received by said connecting trough, and said connecting barb portion is engaged in said inner trough, and when said temples and said connecting elements of said frame are hinged to each other, said hinge pillar is hinged in said hinge trough.

20. A pair of eyeglasses, comprising:

a lens, said lens including a pair of connecting pieces disposed on left and right sides of said lens, wherein said connecting pieces include at least a trough portion;

a pair of temples, including a hinge portion disposed on one end of said temples, wherein said hinge portion is composed of at least a hinge neck portion and at least a hinge pillar, said hinge neck portion being respectively connected to said temples and said hinge pillar; and a pair of connecting elements, said connecting elements including at least a connecting trough, a connecting barb portion, at least a hinge trough, and a hinge passage, said connecting barb portion being disposed on sidewall neighboring to said connecting trough, said connecting elements being respectively connected to said lens and said temples;

wherein when said lens and said connecting elements are connected to each other, said connecting pieces are received by said connecting trough, said connecting barb portion is engaged in said trough portion, and when said temples and said connecting elements are hinged to each other, said hinge pillar is hinged in said hinge trough.

* * * * *